J. A. REYNOLDS.
METHOD OF ROASTING AND PACKING GROUND OR WHOLE COFFEE.
APPLICATION FILED DEC. 4, 1919.
1,426,011.
Patented Aug. 15, 1922.
2 SHEETS—SHEET 2.
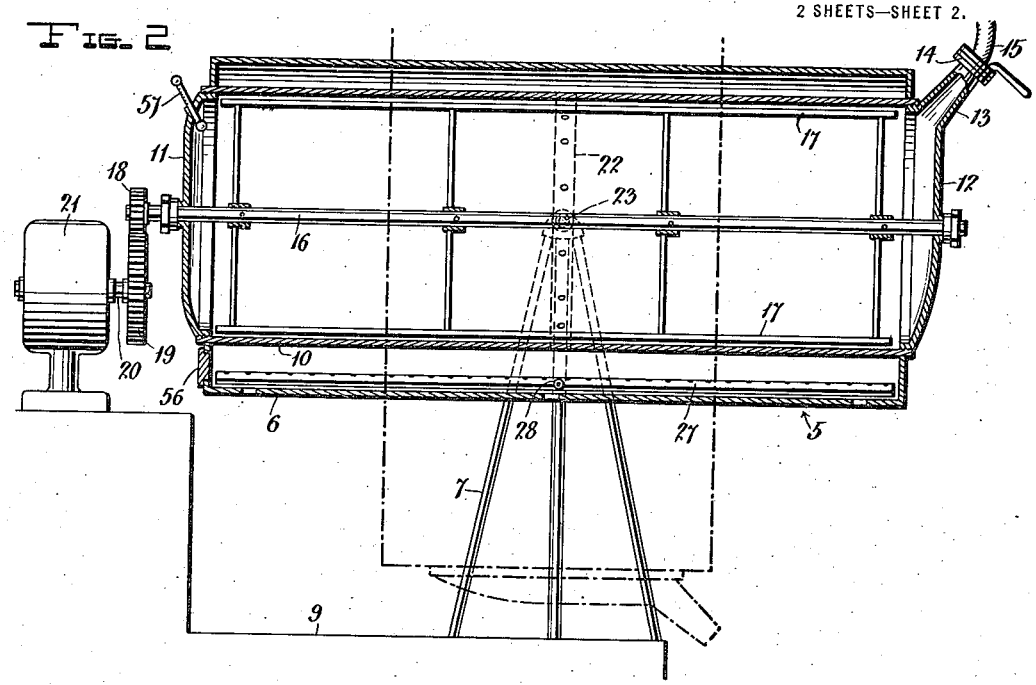
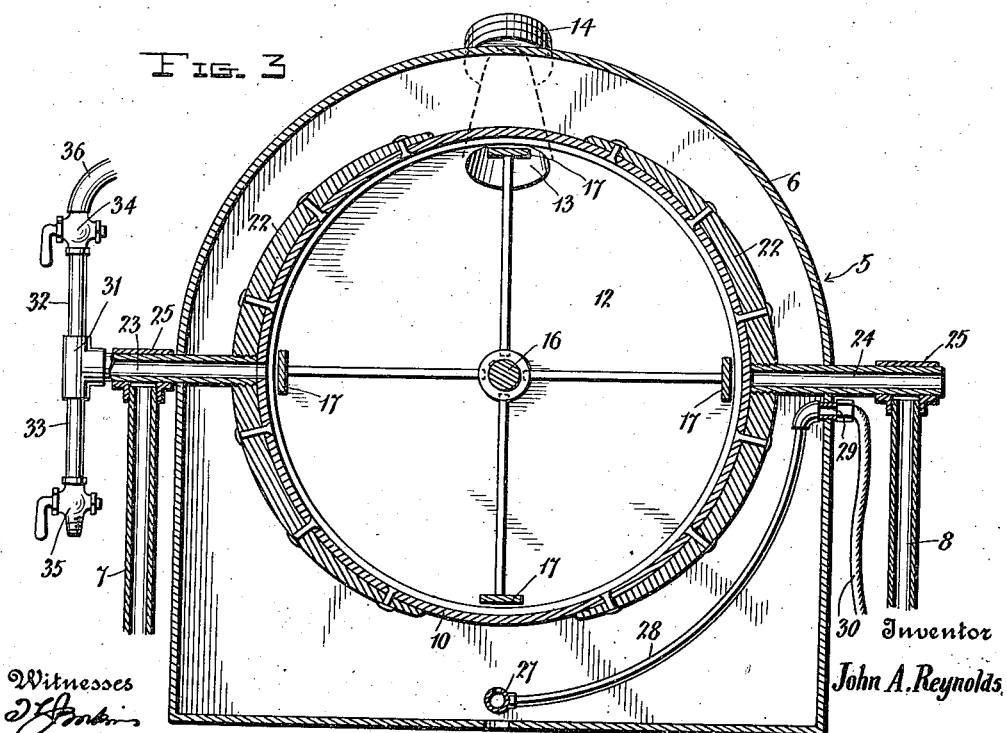
Inventor
John A. Reynolds,
Witnesses

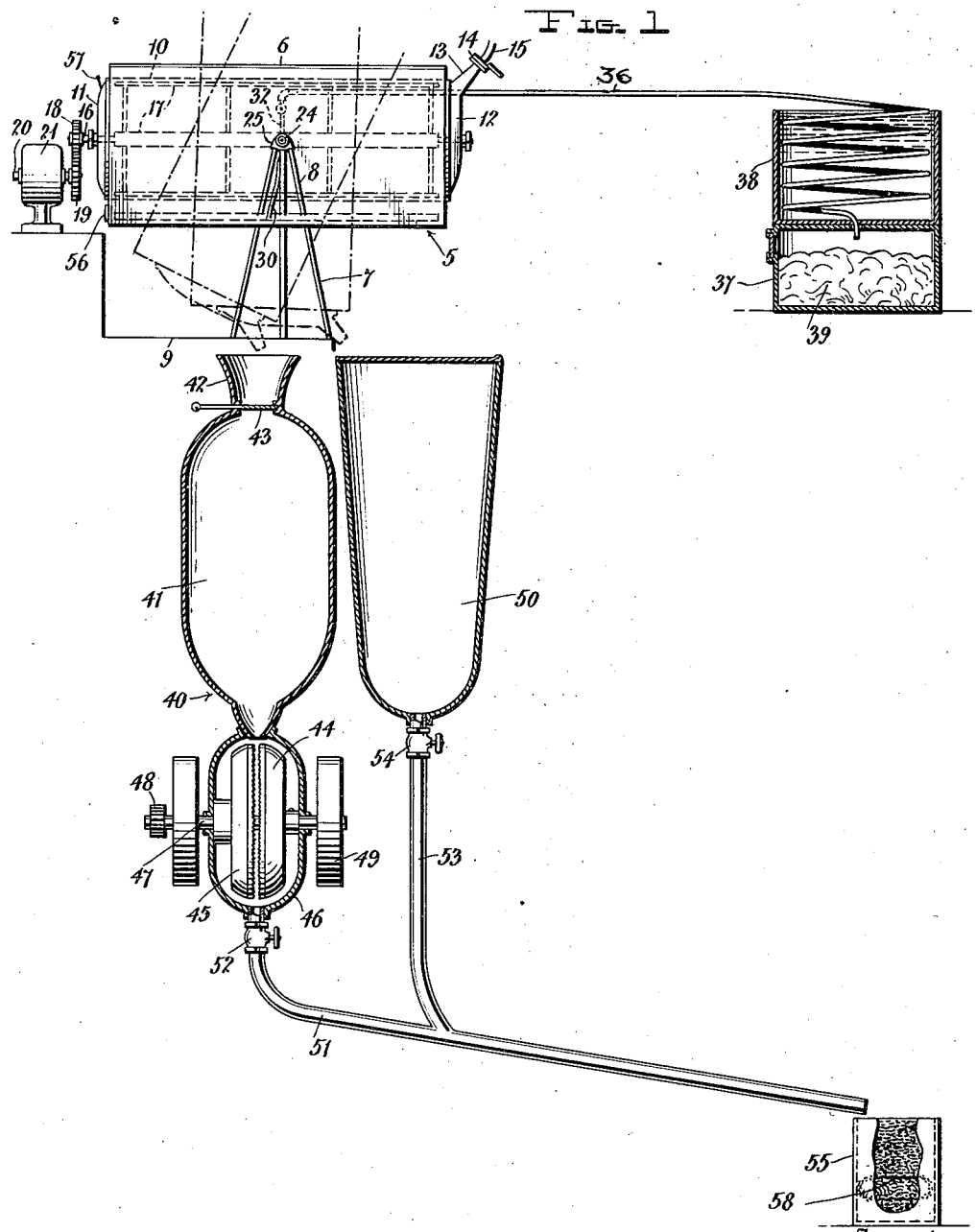

UNITED STATES PATENT OFFICE.

JOHN A. REYNOLDS, OF DETROIT, MICHIGAN.

METHOD OF ROASTING AND PACKING GROUND OR WHOLE COFFEE.

1,426,011.    Specification of Letters Patent.    Patented Aug. 15, 1922.

Application filed December 4, 1919. Serial No. 342,489.

*To all whom it may concern:*

Be it known that I, JOHN A. REYNOLDS, a citizen of the United States, residing at Detroit, in the county of Wayne and State of Michigan, have invented new and useful Improvements in Methods of Roasting and Packing Ground or Whole Coffee, of which the following is a specification.

This invention relates to a method of and mechanism for roasting and packing either whole or ground coffee, and contemplates roasting coffee during air excluded confinement thereof and automatically producing a vacuum in which the roasting operation is effected by liberating the vapors formed and carrying aromatics and flavoring constituents or which is generally known and commercially understood as caffeol; conserving this desirable product by condensation of the vapors and retention in a transferable condition for reincorporation in coffee treated, or in other quantities of the same or lower grades, or in combined grades of coffee. The invention also contemplates the final step of packing the coffee in containers with a predetermined proportion of the condensed product or aromatic or flavoring constituents and hermetically sealing the containers to cause the product to thoroughly permeate and be restored to or reincorporated with the sealed quantity of coffee by evaporation while the air-tight sealed quantity of coffee is affected by heat.

The primary object of the invention is to provide for a simple treatment of roasted coffee beans and ground coffee to restore to and retain in the coffee mass a valuable constituent that is ordinarily lost in the preliminary roasting operation to increase the value of coffee as a desirable beverage and to materially economize in the use of coffee in producing a decoction thereof with the same strength as compared to the required consumption of commonly roasted coffee in similar volumetric quantities for domestic and other service.

In the drawings:—

Figure 1 illustrates a diagrammatic arrangement of one preferred mechanical organization or apparatus by the aid of which the improved method may be practiced.

Figure 2 is an enlarged longitudinal vertical section of the roaster.

Figure 3 is a transverse vertical section through the center of the roaster on a still larger scale.

The apparatus shown comprises a roaster 5 including an outer enclosing casing 6 fulcrumed between suitable supports 7 and 8 secured to a suitable base 9 and whereby the casing 6 may be swung downwardly from a normal horizontal position to discharge the roasted coffee therefrom. Extending into and longitudinally projecting through the casing or drum is a fixed roasting cylinder 10 having opposite exterior end caps 11 and 12 attached thereto in any suitable manner and may be removed. The end cap or head 12 has a spout 13 obliquely extending outwardly therefrom near the point of attachment of the said cap or head to the cylinder 10. This spout flares inwardly towards and into the cylinder 10 and has a suitable cut-off valve 14 at its outer end to which a supply pipe 15 is adapted to be removably attached. The oblique or angular disposition of the spout 13 with the head 12 provides the cylinder 10 with a practical discharge chute extremity for quickly relieving the cylinder of its roasted contents when the casing 6 and said cylinder are downwardly tilted as shown in dotted lines by Figures 1 and 2. A shaft 16 centrally extends through the cylinder 10, engaging suitable air-tight bearings in the centers of the caps or heads 11 and 12, and having stirrers or agitating arms and blades 17 thereon within the cylinder 10 to regularly move the coffee within the cylinder during the roasting operation. On the rear end of the shaft 16 a gear 18 is fixed and arranged to register or mesh with a larger gear 19 on the projecting end of a shaft 20 of a motor 21 held on an elevated part of the base 9. The gear 18 is over the gear 19 and the two gears are disengaged when the cylinder 10 is tilted downwardly and are reengaged when the drum and cylinder are restored to horizontal position. The cylinder 10 has opposite reinforcing or strengthening segments 22 riveted thereto and dressed or milled off as shown to provide positive means for attachment of tubular trunnions 23 and 24 secured to diametrically opposite portions of the cylinder and also extending outwardly through and secured to the opposite sides of the casing 6. The trunnions 23 and 24 have a rotatable mounting in bearings 25 at the upper ends of supporting frames or uprights 7 and 8 rising from the base 9. The trunnion 23 opens into the interior of the cylinder 10 and the trunnion 24 extends through the adjacent segment 22 and abuts against and is closed by the outer surface of this cylinder, as clearly shown by Figure 3. By this form of mounting the casing 6 and the cylinder 10 are caused to swing as a unit without straining or distorting the said cylinder or casing, and moreover, the cylinder is rendered air-tight to provide for the formation of a vacuum therein and to prevent leakage of any of the coffee vapors therein from the coffee during roasting of the latter.

Within the bottom portion of the casing 6 below the cylinder 10 a suitable heater is installed, and for practical illustration of one form of heater, adapted for the purpose, the drawings show a rigid burner pipe 27 for gas or other fuel, this burner pipe having a fuel feed connection 28 extending upwardly to a point adjacent to the trunnion 24 and attached to a coupling device 29 mounted in the rear side of the casing 6. To the outer end of the coupling device 29 a flexible supply pipe 30 is terminally applied and is adapted to connect with any main source of fuel supply. The flexibility of the pipe 30 permits the casing 6 and cylinder 10 to have the desired movement without affecting the supply of fuel.

The trunnion 23 of the casing 6 has a T-union or coupling 31 connected thereto and provided with oppositely extending tubular arms or outlets 32 and 33, respectively having control valves 34 and 35. To the arm 32 a pipe 36 is attached and runs to and extends into a chamber or receptacle 37 within a condenser 38, the chamber or receptacle containing a quantity of a suitable absorbent material 39, or an absorbent substance, such for instance what is known as absorbent cotton. The remaining tubular arm 33 is used at certain intervals for momentarily exhausting the drum of deleterious vapors preliminarily liberated from the green coffee under action of heat prior to pursuing the recovery and retention of the valuable coffee constituent sought and essential in carrying out the method by opening the valve 35, the valve 34 being closed during such preliminary exhaust.

Below the roaster a grinding mill 40 is arranged, and is essentially of that form known as a drug-mill comprising a hopper chamber 41 having an inlet 42 shown with a cut-off valve 43. This mill also embodies fixed and rotating elements 44 and 45 mounted within a suitable casing 46, the rotating element 44 being operated through the medium of a shaft 47 having a gear or pinion 48 to which power may be transmitted from any suitable source. As usual, the shaft 47 is provided with fly or balance wheels 49. Adjacent to the mill 40 is a receptacle 50 for receiving whole roasted coffee directly from the cylinder 10 when grinding or powdering of the coffee is undesirable. From the bottom of the grinding mill an outlet pipe 51 extends and is provided with a valve 52 to control discharge of the said mill. The bottom of the receptacle 50 has an outlet pipe 53 connected thereto and also provided with a valve 54. The pipe 51 is preferably projected downwardly at an angle of inclination to serve as a conveying or delivery outlet, and the pipe 53 connects therewith, whereby either ground or powdered or whole roasted coffee grains may be packed in a container 55, this container filling or packing operation being carried on with a number of cans or other containers successively disposed in filling position by any approved or well known means.

In carrying out the method, the roasting cylinder 10 is charged with a desired quantity of green coffee by means of the spout 13 and pipe 15 which connect with any suitable source of supply of green coffee, the valve 14 being opened to permit the coffee to flow into the said cylinder. After the cylinder 10 has been charged, the valve 14 is closed and the pipe 15 detached from the said valve and spout 13. The heater or burner pipe 27 is ignited by any suitable means, for instance, through a normally and tightly closed opening 56 in the casing, and the shaft 16 is set in motion or rotated to cause the blades 7 to stir the coffee and subject it to the action of steady heat within an air-tight enclosure. The length of time required to complete the roasting operation will depend upon the character of the coffee roasted, but under all conditions and circumstances it will be understood that the roasting operation will be continued until the charge of coffee is thoroughly roasted without burning.

When the roasting operation begins the valves 34 and 35 of the tubular arms 32 and 33 attached to the T-union or coupling 31, will be closed, and after the coffee has been subjected to the roasting operation for a certain interval the valve 35 is opened to permit the escape of certain deleterious vapors preliminarily liberated from the green coffee within the cylinder 10, as hereinbefore specified. The exhaust of the cylinder 10 is effected only for a short interval and the valve 35 is again closed. During the roasting of the coffee in the air-tight cylinder 10, the vapors passing off from the coffee under the action of heat will be held within said cylinder and mingled with these vapors, are the valuable constituents which are desired to be recovered and including what is generally known and commercially understood as caffeol. At a certain interval subsequent to the preliminary exhaust of the cylinder 10, as above noted, the valve 34 is opened and the vapors carrying the caffeol pass out through the T-union or coupling 31 into the tubular arms 32 and 33, and as the arm 32 is open to the pipe 36, the said vapors carrying the caffeol and other constituents desired to be conserved, will be conveyed to the chamber of receptacle 37 within the condenser 38, the end of the pipe 36 being held in sealed association with the absorbent material or cotton 39, and the same absorbent material receives the condensed vapors and caffeol and retains and serves as a carrier for the condensed vapors including caffeol for subsequent use. When each charge of the coffee has been subjected to the roasting operation within the cylinder 10 for the requisite length of time and under the proper degree of heat which will be easily determined by means of a thermometer 57 suitably applied to the roaster, the valve 34 is closed, and in fact this valve may be closed at a time when there ceases to be any vapors carrying caffeol or other constituents and passing through the pipe 36 to the chamber or receptacle 37 within the condenser 38, this cessation of conveyance of vapors ensuing when the coffee has reached such a roasting state that all vapors and other volatile substances will have passed off therefrom. From the cylinder 10 the roasted coffee is delivered, by downwardly tilting the roaster through the medium of the discharge chute consisting of the head or cap 12 and spout 13, either to the top of the hopper chamber 41 of the mill 40 after opening the cut-off valve 14, where it is subjected to a grinding operation, or to the top of the receptacle 50 for receiving whole roasted coffee directly from the cylinder when it is desired to pack whole coffee. In grinding the coffee it is preferred that it be reduced to what is known at No. 20 powder, and from this grinding mill the powdered coffee is conveyed by means of the outlet pipe 51 by opening the valve 52 and permitted to pass into one of the containers or cans 55. In the same manner whole roasted coffee may be supplied to the container from the receptacle 50. After a certain amount of either the ground or whole roasted coffee has been deposited in the can or container 44, a portion of the cotton or other cellulose 39 carrying, by absorption, what is commercially known at caffeol and other valuable constituents which have been condensed and absorbed thereby is taken from the receptacle 37 and enclosed in a wire gauze covering 58 to prevent the coffee in either form from adhering thereto and deposited within the partially filled container, and filling of the latter is then completed and finally the said container is hermetically sealed. Each container thus filled, either with ground coffee or whole coffee and having cellulose or other substance inserted therein carrying the condensed coffee constituents, is allowed to stand a reasonable length of time, say for instance from 156 to 624 hours, and maintained near a temperature of about 90° C. to cause the coffee to absorb the charged proportion of the caffeol and other constituents by vaporization.

In some instances the cellulose absorbent or retaining carrier 39 may be preliminarily subjected to a suitable or chemical treatment to render the same more sensitively absorptive, but under ordinary conditions the cellulose or absorbent cotton in its normal condition will be practicable for the purpose of receiving and retaining as a menstrum the condensed vapors carrying what is known as caffeol. The same operation of introducing the cellulose absorbent saturated with what is known as caffeol within each can or container for the whole or ground coffee, is pursued until the charge of coffee is fully exhausted or has been packed and each successive charge of coffee will be similarly treated and packed.

The improved method, as hereinbefore described, will materially add to the flavor of the coffee treated, and particularly the cheaper grades of coffee, by reason of the fact that a restoration and reincorporation of a very valuable constituent of the coffee is carried on relatively to the coffee as packed, and the packed coffee permitted to take up this valuable constituent which, under ordinary methods of roasting and coffee treatment, will pass off and is lost.

One of the most essential steps or feature of the present improved method is the roasting of the coffee in vacuo or in a vacuum produced within the cylinder 10 which is absolutely air-tight or has all parts thereof so constructed and arranged that the air is completely excluded therefrom. The vacuum is produced in the cylinder 10 by the exhaust of the vapors carrying what is ordinarily known as caffeol, into and through the pipe 36, such exhaust obviously creating a suction within the cylinder and the formation of the vacuum, as specified, is a consequence. The roasting of the coffee in accordance with the present method in a closed receptacle or one from which the outside air is completely excluded, not only renders it possible to advantageously liberate and recover the valuable constituents sought, but also prevent chaffing of the coffee during the roasting operation, and as a consequence, a valuable part, or what is ordinarily known as the hull, is retained intact with the coffee beans, and loss of weight of the coffee thus roasted is materially reduced and at the same time the commercial value of the coffee is greatly enhanced.

It will be understood that the cellulose means for or the absorptive substance used as a menstruum carrying the condensed vapors, and what is ordinarily known as caffeol, may be disposed in various quantities within the cans or containers in the manner hereinbefore specified, and in some instances it might be desirable to similarly incorporate a rather large quantity or portion of such cellulose carrying the condensed vapors including caffeol in a relatively large body or volume of coffee, either whole or ground, and hermetically seal the same and subject such larger quantity to a season of development and necessary temperature degree until the large quantity of the coffee thus treated has taken up, by permeation, the constituent desired to be incorporated therein.

When the hermetically sealed whole or ground coffee having the absorptive cellulose carrying the desirable constituents including what is ordinarily known as caffeol, therein, has reached the stage where it is adapted for commercial vendition the coffee so treated will be of a moist, oily condition or will not mass or mat or there will be no grain, bean or particle adherence greater than would ensue from the coherence of the oily condition of the beans, particles or grains. It is also intended to grind the coffee, when ground coffee is treated in accordance with the present method, to any degree of fineness that may be desired.

The foregoing method will be practiced in increasing the quality and commercial value of the lower grades of coffee by incorporating therewith the aromatics, volatile and essential oils, etc., derived from higher grades of coffee richer in or having a comparatively larger percentage of the said desirable components therein. In this application of the method, a quantity of high grade coffee will be roasted in the roaster 5 and the vapors carrying the desirable flavoring and aromatic components will be conveyed away from the roasting coffee and condensed and conserved or retained as hereinbefore explained, and quantities of a lower or inferior grade of coffee in whole roasted or ground condition will be enclosed and subjected to the permeating action of the said condensed and conserved components taken from the higher grade coffee. In pursuing this application of the method a comparatively small quantity of higher grade coffee will be roasted and the valuable aromatic and flavoring components taken therefrom in vapor form and condensed and conserved, and much larger quantities of the lower grade of coffee to be treated, either as found in the market or in green form and similarly roasted, will have the said condensed higher grade flavoring and aromatic components incorporated therewith. When the lower grade coffee to be treated is green and subjected to the preliminary air excluded roasting step, the flavoring and aromatic components therein and liberated by the action of heat will be conveyed away from the roasting coffee and condensed and subsequently reincorporated in the roasted lower grade of coffee in the same manner hereinbefore explained in treating the better grades of coffee, and then the higher grade or richer condensed flavoring and aromatic components added thereto. This addition of the higher grade or richer condensed components may be effected by a further incorporation thereof in the lower grade coffee, either whole or ground, when the said latter quality of coffee is packed, or the two grades of condensed flavoring and aromatic components may be first mixed and as a unit incorporated in the lower grade coffee by one operation.

A further development of this particular application of the present method is to combine relative proportions of high and low grades of coffee in the roaster and effect a transfusion of the aromatic and flavoring constituents of the different grades of coffee within the roaster and then convey the said mingled or incorporated vapors carrying the aromatic and flavoring constituents away from the roaster and condensing and retaining the condensed aromatic and flavoring constituents of the two grades of coffee and reincorporate said condensed constituents in the charge of combined coffee grades, either whole or ground, from which the said constituents have been separated, or, reincorporated with independent quantities of low grades of coffee, either roasted or whole, as found in the market.

That portion of the components of roasted coffee which give the pleasing flavor and aroma to coffee is ordinarily considered to be and commercially designated as "caffeol." The term "caffeol" as hereinbefore applied is therefore intended for clearness and brevity of reference, to mean all those aromatic, volatile and essential oils, etc., which give the coffee its pleasing flavor and odor. Hence, it will be understood that "caffeol" is hereinbefore used solely as a concrete designatory term irrespective of accuracy of definition.

What I claim is:—

1. The method of treating and packing coffee, consisting in roasting a charge of green coffee in an air-excluded enclosure and producing a vacuum therein, liberating the vapors carrying the aromatic constituents of coffee to and conserving them by condensation and causing such condensed constituents to be absorbed by a cellulose menstruum, and depositing a quantity of the roasted coffee with a portion of the cellulose menstruum in an enclosure and hermetically sealing the latter.

2. The method of treating and packing coffee, consisting in roasting a charge of green coffee in an air-tight enclosure and producing a vacuum therein, liberating the vapors carrying the valuable aromatic constituents of coffee from the charge of coffee while roasting and condensing the said constituents, depositing the condensed constituents of the coffee on an absorbent cellulose menstruum, and depositing a quantity of the charge of coffee and a portion of the cellulose menstruum carrying the condensed coffee constituents within the said quantity of coffee in a container and hermetically sealing the latter.

3. The method of treating and packing coffee, consisting in roasting a charge of coffee in an air-excluded enclosure and producing a vacuum in the latter, conveying the vapors and aromatic and flavoring constituents liberated from the coffee during the roasting thereof, condensing and conserving the said constituents by depositing them upon an absorbent cellulose menstruum, and incorporating a part of the said menstruum carrying the condensed constituents within the body of a quantity of the roasted coffee and sealing and allowing the latter to stand for permitting permeation of the quantity of coffee by the constituents carried by the menstruum.

In testimony whereof I have hereunto set my hand in presence of a subscribing witness.

JOHN A. REYNOLDS.

Witness:
   CHAS. S. HYER.